April 19, 1938.  L. N. NOMAR  2,114,311
COMBINED MAGAZINE AND EXTENSION STOCK FOR AUTOMATIC PISTOLS
Filed Nov. 21, 1936  7 Sheets-Sheet 2
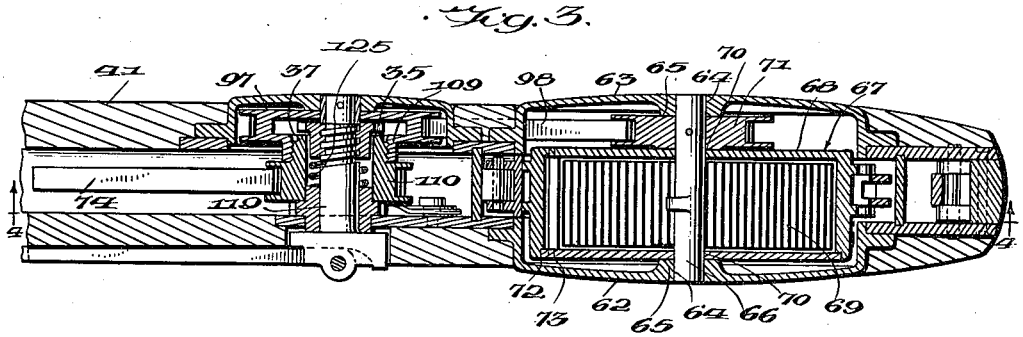
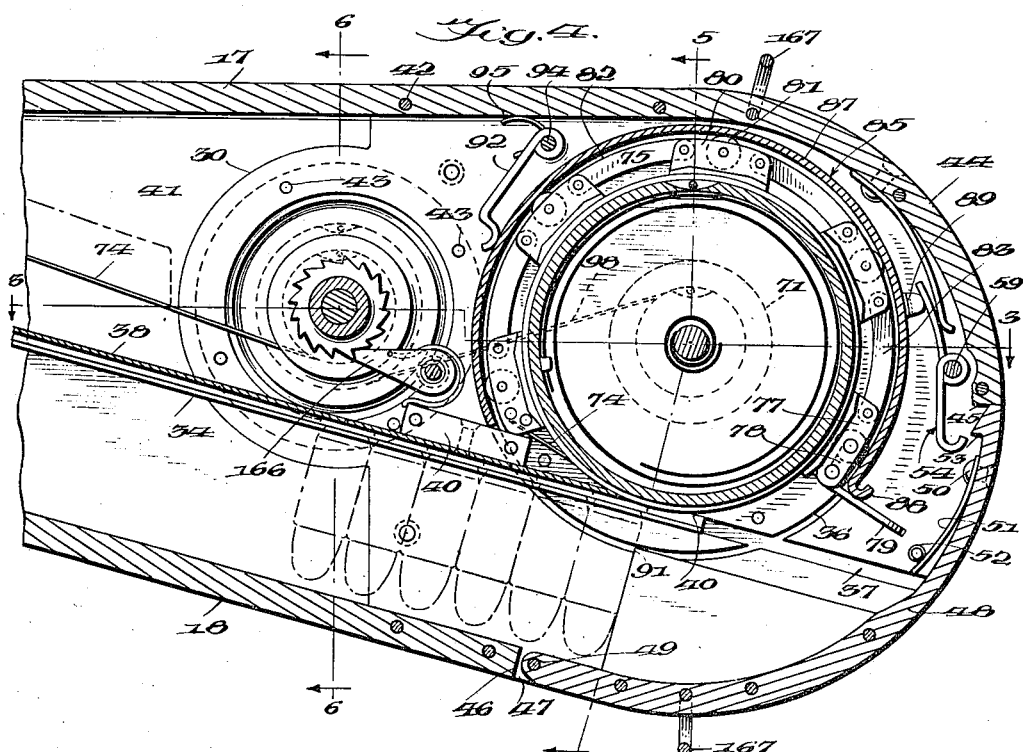
Inventor
Louis Nolan Nomar,
By Kimmel & Crowell
Attorney

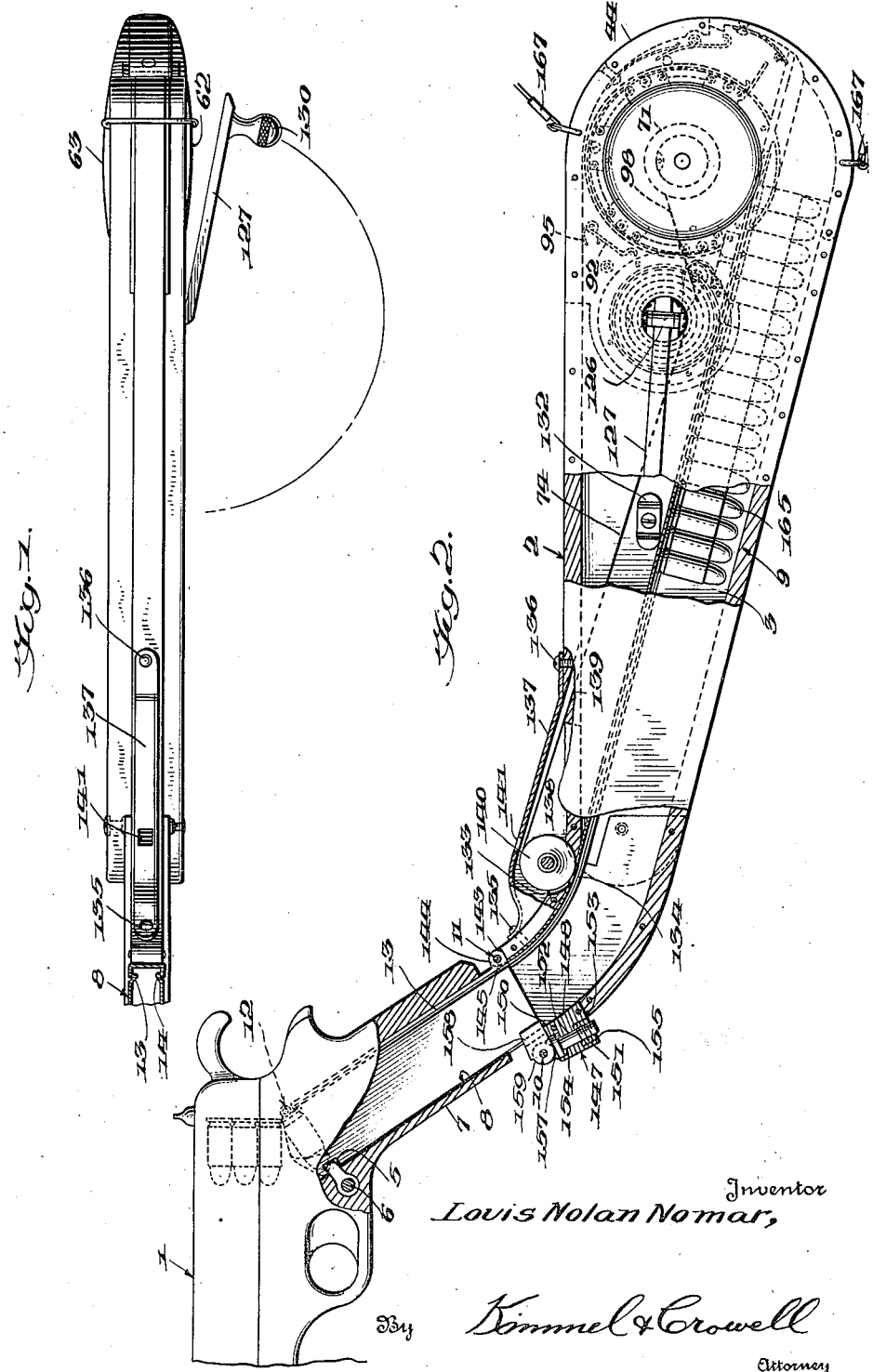

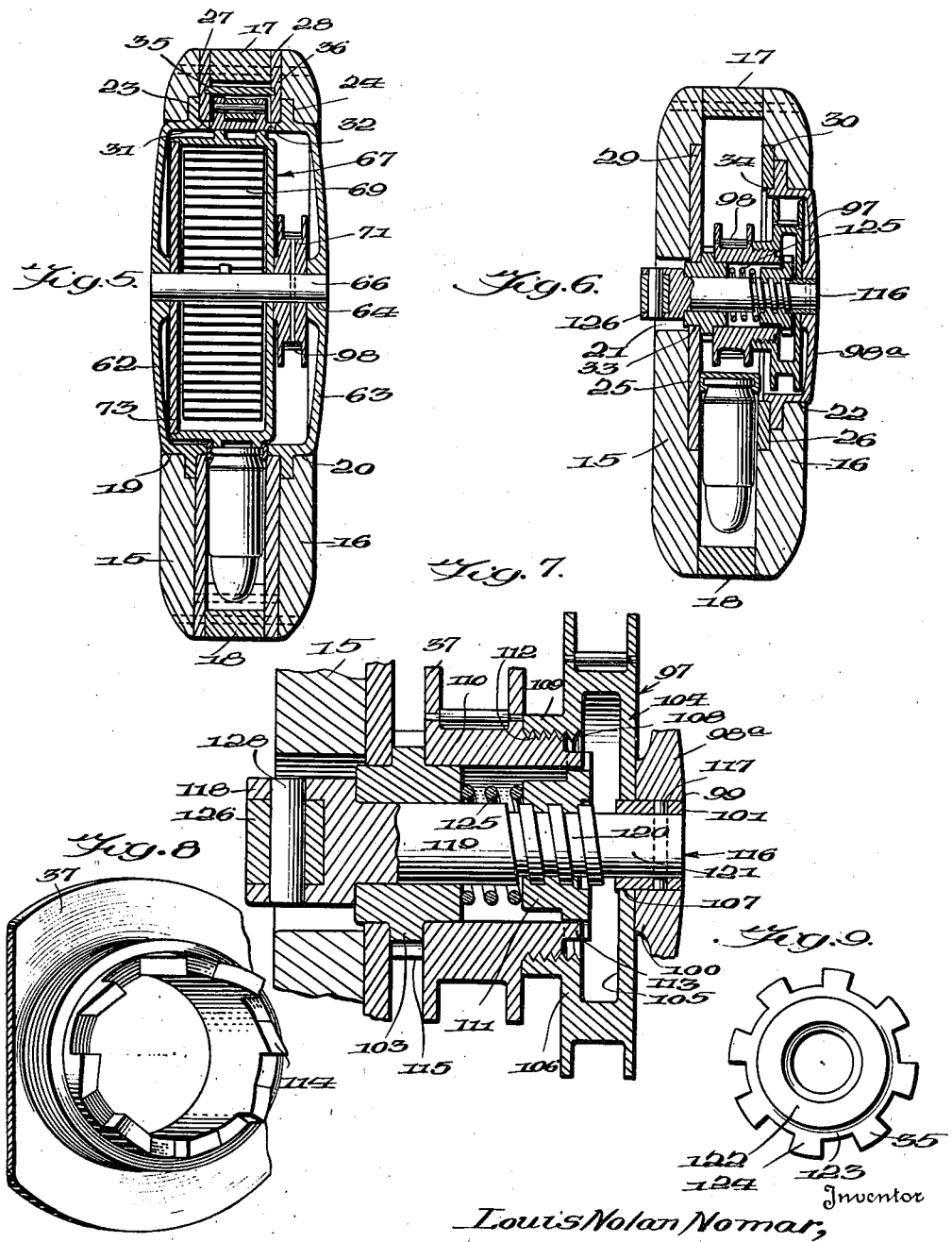

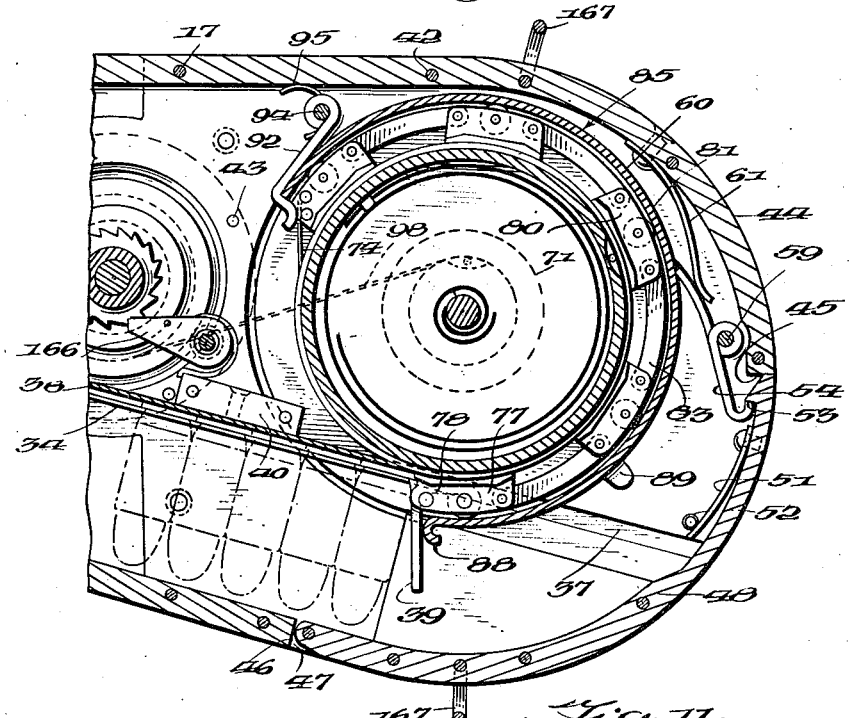

April 19, 1938. L. N. NOMAR 2,114,311
COMBINED MAGAZINE AND EXTENSION STOCK FOR AUTOMATIC PISTOLS
Filed Nov. 21, 1936 7 Sheets-Sheet 5
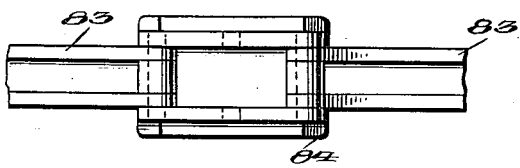
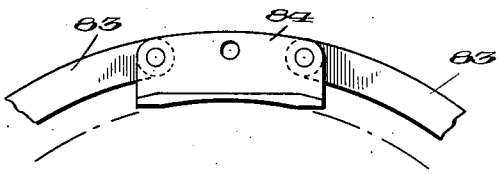
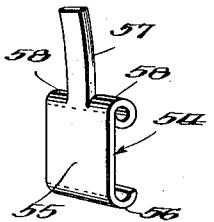
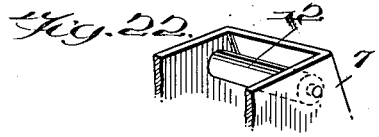
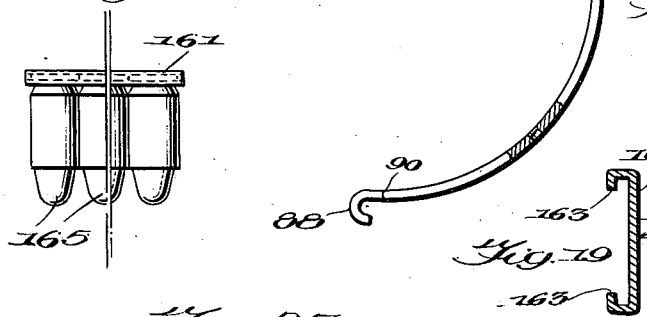
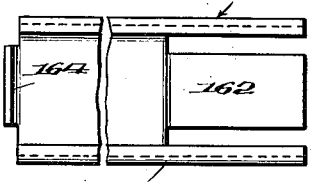
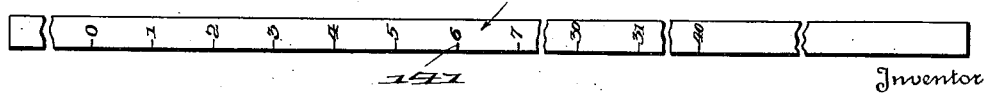
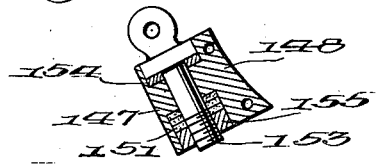
Inventor
*Louis Nolan Nomar,*
By *Kimmel & Crowell*
Attorney

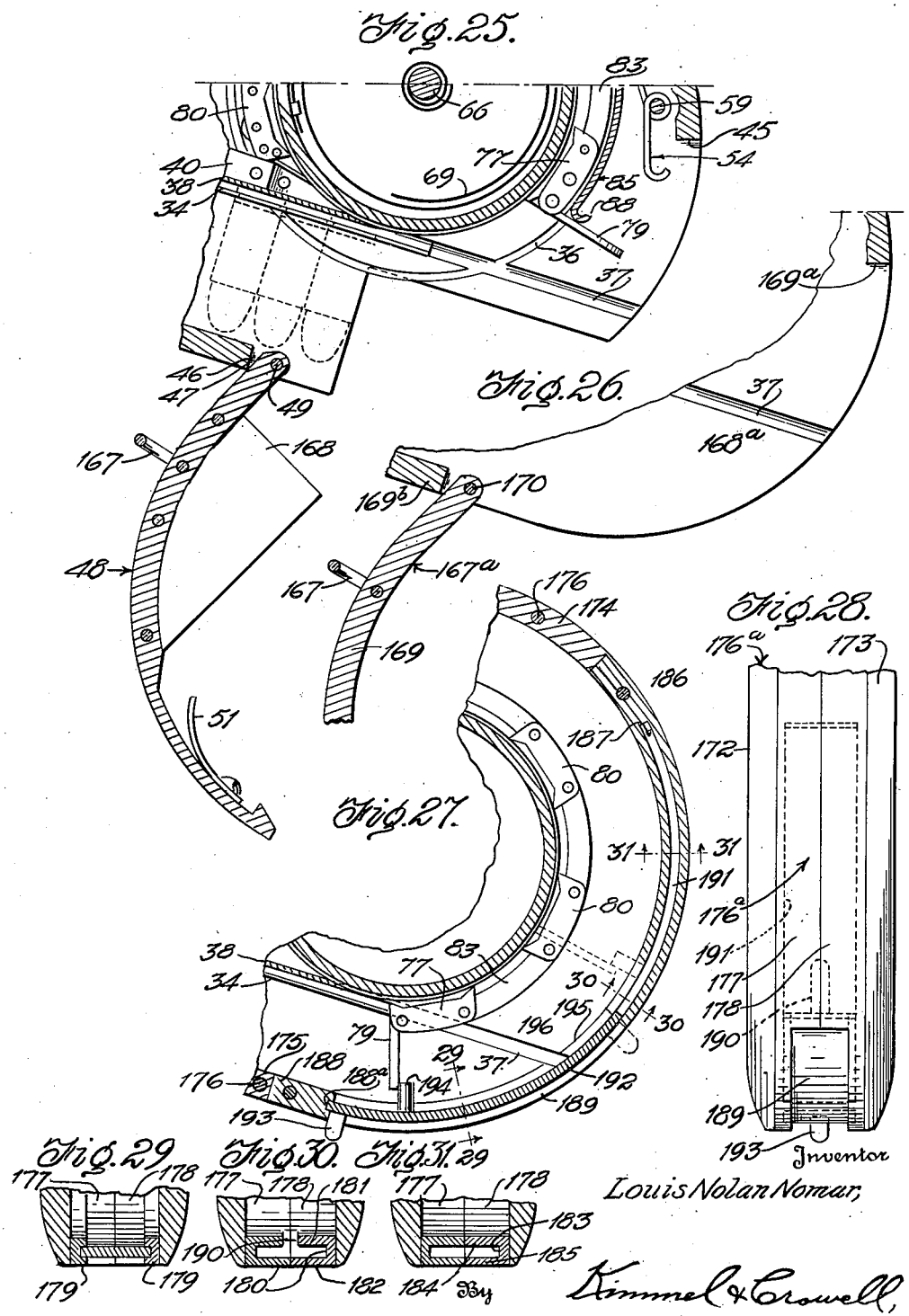

April 19, 1938. L. N. NOMAR 2,114,311
COMBINED MAGAZINE AND EXTENSION STOCK FOR AUTOMATIC PISTOLS
Filed Nov. 21, 1936 7 Sheets-Sheet 7
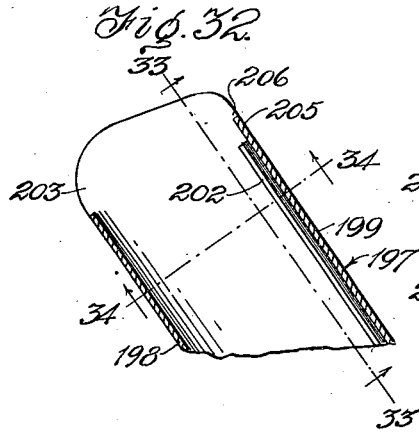
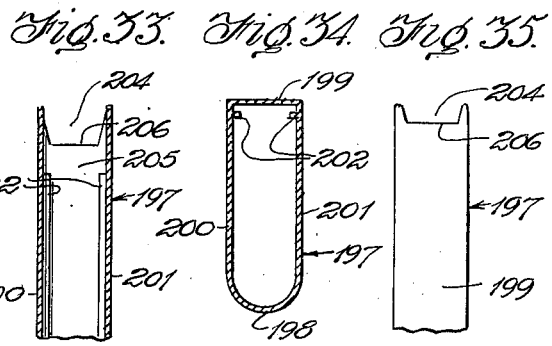
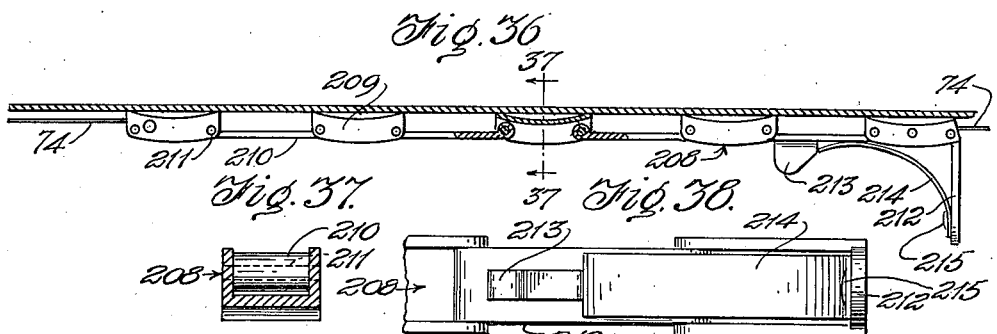
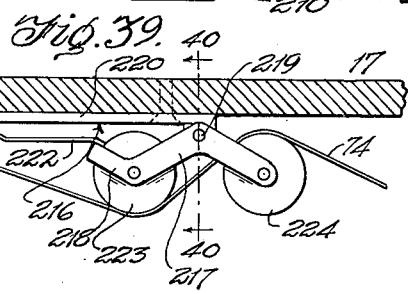
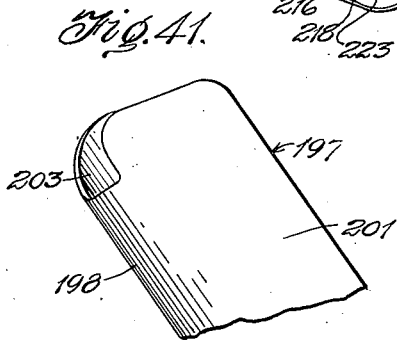
Inventor
*Louis Nolan Nomar;*
By *Kimmel & Crowell*
Attorneys Patented Apr. 19, 1938

2,114,311

UNITED STATES PATENT OFFICE 2,114,311

COMBINED MAGAZINE AND EXTENSION STOCK FOR AUTOMATIC PISTOLS

Louis Nolan Nomar, Charleston, W. Va.

Application November 21, 1936, Serial No. 112,160

22 Claims. (Cl. 42—49)

My invention relates to a combined magazine and extension stock for automatic pistols.

The primary object of my invention is to provide, in a manner as hereinafter set forth, a stock of the class referred to for detachable connection to the handle of an automatic pistol for bearing below the shoulder of a person during the firing of the pistol.

A further object of my invention is to provide, in a manner as hereinafter set forth, an extension stock for detachable connection to the handle of an automatic pistol of the magazine type and including means for successively and automatically feeding cartridges into the handle of the pistol for firing.

A further object of my invention is to provide, in a manner as hereinafter set forth, an extension stock for detachable connection to the handle of an automatic pistol of the magazine type and including means for storing a greater number of cartridges than that capable of being loaded in the magazine of the pistol.

A further object of my invention is to provide, in a manner as hereinafter set forth, an extension stock for connection to an automatic pistol having the advantage of receiving a greater number of cartridges to be supplied to the pistol at each reloading than the number of cartridges capable of being received by the magazine of the pistol when the stock is not employed for extension purposes.

A further object of my invention is to provide, in a manner as hereinafter set forth, for the transforming of a regular service automatic pistol into a firearm of the type of a submachine gun.

A further object of my invention is to provide in a manner as hereinafter set forth, a stock of the class referred to including as an element thereof shock-absorbing means.

A further object of the invention is to provide, in a manner as hereinafter set forth, a stock of the class referred to with new and improved means for shifting a cartridge from a position inclined to the horizontal when fed into the pistol.

A further object of the invention is to provide, in a manner as hereinafter set forth, a stock of the class referred to including a spring controlled door, at the rear end of the stock, for the cartridge magazine, a spring controlled latch for the door, and a new and improved releasing means for the latch to permit the door automatically opening for reloading purposes.

A further object of the invention is to provide, in a manner as hereinafter set forth, a stock of the class referred to including a cartridge magazine having a reloading opening closed by a spring controlled door, a spring controlled latch for maintaining the door closed during the feed of the cartridges to a point of utilization, a cartridge feeder or pusher structure travelling into and out of said magazine, and means under the control of said structure for releasing said latch when said structure is in its and is returned to its initial position and to allow the activity of the latch to maintain the door closed when the structure is feeding the cartridges.

A further object of my invention is to provide, in a manner as hereinafter set forth, an extension stock of the magazine type for detachable connection to an automatic pistol designed to be used as a rifle or gun stock against or under the shoulder and for supplying cartridges to the pistol.

A further object of my invention is to provide, in a manner as hereinafter set forth, a combined extension stock and magazine for automatic pistols including cartridge feeding means travelling in the magazine and means for shifting the feeding means clear of the magazine when reloading.

Further objects of the invention are to provide, in a manner as hereinafter set forth, a combined magazine and extension stock for the purpose referred to which is comparatively simple in its construction and arrangement, strong, durable, compact, readily assembled, thoroughly efficient in its use and comparatively inexpensive to manufacture.

With the foregoing and other objects in view which may appear herein, the invention consists of such parts and such combination of parts as are hereinafter more specifically described and are as illustrated in the accompanying drawings, wherein is shown the preferred embodiment of the invention, but it is to be understood that changes, variations and modifications may be resorted to which fall within the scope of the invention as claimed.

In the drawings:—

Figure 1 is a fragmentary view in top plan of the stock,

Figure 2 is a side elevation, partly broken away and partly in vertical section, of the stock showing the adaptation thereof with the handle of a revolver, Figure 3 is a section on line 3—3, Figure 4, Figure 4 is a section on line 4—4, Figure 3 with the latch for the magazine door in non-active position, Figure 5 is a section on line 5—5, Figure 4, Figure 6 is a section on line 6—6, Figure 4, Figure 7 is a longtiudinal sectional view of the winch mechanism, Figure 8 is a fragmentary view in perspective of the spool or drum of the winch mechanism, Figure 9 is a view looking towards the inner face of the toothed driving member for the spool of the winch mechanism, Figure 10 is a view similar to Figure 4 with the latch for the magazine door in active position, Figure 11 is a fragmentary view in sectional plan of the stock showing the guide roller for the pull member for the cartridge feeder or pusher structure, Figure 12 is a fragmentary view in sectional plan illustrating the pivoted latchable handle of the winch mechanism, Figure 13 is a fragmentary view in top plan and Figure 14 is a fragmentary view in side elevation of the carriage of the cartridge feeder or pusher structure with the bearing rollers removed.

Figure 15 is a top plan view broken away of the magazine door latch controlling element, Figure 16 is a perspective view of the latching member for the magazine door, Figure 17 is a front elevation of the latching device for the latch controlling element, Figure 18 is an edge view of the latch controlling element and the releasing device for the latter, said element is shown in latched position, Figure 19 is a transverse cross sectional view of the cartridge clip, Figure 20 is a top plan view broken away of the cartridge clip, Figure 21 is a fragmentary view in side elevation of the cartridge clip with a plurality of cartridges suspended thereby.

Figure 22 is an enlarged detail view of the cartridge trip,

Figure 23 is a vertical sectional view upon an enlarged scale of the shock absorber, Figure 24 is a top plan view broken away of the pull member for the cartridge feeder or pusher structure, Figure 25 is a fragmentary view in vertical section illustrating the door for the cartridge magazine open, Figure 26 is a fragmentary view in vertical section of a modified form of door for the cartridge magazine and with the door in open position, Figure 27 is a fragmentary view in vertical section illustrating still another modified form of the cartridge magazine door structure and with the door in closed position, Figure 28 is a rear elevation of the structure shown in Figure 27, Figures 29, 30 and 31 respectively are sections on lines 29—29, 30—30 and 31—31, Figure 27, Figure 32 is a fragmentary view in lengthwise section of a modified form of the leading part of the body of stock, Figure 33 is a section on line 33—33, Figure 32, Figure 34 is a section on line 34—34, Figure 32, Figure 35 is a fragmentary view in elevation looking towards the top edge of the leading part shown in Figure 32, Figure 36 is a side elevation of a modified form of cartridge pusher or feeder mechanism, Figure 37 is a section on line 37—37, Figure 36, Figure 38 is a fragmentary view upon an enlarged scale looking towards the lower face of the mechanism shown in Figure 36, Figure 39 is a side elevation of a vibration absorber for the flexible pulling element for the cartridge pusher mechanism, Figure 40 is a section on line 40—40, Figure 39, and Figure 41 is a fragmentary view in perspective of the leading part shown in Figures 32 to 35.

The drawings illustrate, by way of example, an embodiment of the invention as used in connection with a forty-five calibre automatic Colt pistol 1. The combined magazine and extension stock element is in the form of an elongated hollow body 2 having an up-turned forward end. The body 2 provides a magazine 3 designed to carry forty cartridges. A clip for holding forty cartridges for reloading is indicated at 4 (Figure 20). It is to be understood however, that the capacity of the magazine 3 may be as desired and that the capacity of the clip 4 may be other than that as stated. The capacity of the magazine preferably is always greater than that of the magazine of the pistol. When it is deemed necessary to fire more cartridges than the pistol carries, as regularly manufactured, the operator removes the magazine from the pistol and inserts the upturned end of body 2 into the handle of the pistol whereby the larger number of cartridges carried by body 2 will successively and automatically be supplied or fed, by a means to be hereinafter described, to the pistol to be fired. In this connection attention is directed to Figure 2. The forward end of body 2 is notched, as at 5, for the reception of the pistol's magazine retaining means 6, of known form, for coupling end portion to handle 7 of pistol 1. The body 2 is of rectangular contour in vertical section.

The body 2 consists of leading and follower parts 8, 9. The part 8 is of less length and thickness than that of and extends upwardly at a forward inclination with respect to the part 9. The major portion of the length of part 8 is to be extended into, connected to and snugly fits the pistol handle 7. The notch 5 is formed in the part 8 in proximity to its upper end. The part 8 is anchored at its rear end, as at 10, 11, to the forward end of part 9 and the inner face of part 8 forms a continuation of the inner face of part 9. The notch 5 is formed in the front edge of part 8. Arranged within part 8, in proximity to the inner face of the rear edge thereof, is a roller 12 (Figure 2) constituting a trip for shifting the cartridges from a position inclined to the horizontal as the cartridges enter the body of the pistol. The roller 12 is arranged at the upper end of part 8 and is disposed at right angles to the path of travel of the cartridges. The roller 12 is arranged above the notch 5 and is journaled in the sides of part 8. The sides of part 8 are crimped inwardly and lengthwise thereof in proximity to the rear edge of part 8 to provide spaced parallel cartridge guides 13, 14 extending from the rear end of part 8 to a point in close proximity to roller 12.

The part 9 is substantially of triangular contour and has an upstanding, curved forward end terminal portion which abuts and is anchored to the part 8 as indicated at 10, 11. The part 9, for the major portion of its length, has a straight top edge and an inclined bottom edge. The rear end of the part 9 is rounded. The part 9 includes a pair of side cheeks 15, 16, a top member 17 and a bottom member 18. The side cheeks gradually increase in height from a point in proximity to their forward ends to their rear ends. The side cheeks 15, 16 are arranged in parallel spaced relation and the top and bottom members 17, 18 are arranged between the side cheeks and flush with the edges of the latter. The side cheeks 15, 16, in proximity to their rear ends, are formed with large openings 19, 20 respectively, of the same diameter and arranged in parallelism. The side cheek 15, forwardly of the opening 19 is provided with an opening 21 of materially less diameter than the opening 19. The side cheek 16, forwardly of the opening 20, is provided with an opening 22 of greater diameter than the opening 20. The inner faces of the side cheeks 15, 16 are provided with annular rabbets 23, 24 which border the openings 19, 20 respectively, at the inner ends of the walls of said openings. The side cheek 15 has its inner face formed with a rabbet 25 which borders the opening 21 at the inner end of the wall of the latter. The side cheek 16 is formed with a stepped rabbet 26 which borders the opening 22 at the inner end of the wall of the latter. Positioned against the inner faces of the reduced rear terminal portions (Figure 1) of the side cheeks 15, 16 are plates 27, 28 respectively, formed with rounded extensions 29, 30 respectively, at their forward ends. These extensions are spaced from the top and bottom edges of the plates. The extension 29 is mounted in the rabbet 25. The extension 30 is mounted in the largest stepped portion of the rabbet 26. The top and bottom members 17, 18 are arranged between the plates 27, 28. These plates are arranged at the rear end terminal portions of the side cheeks. The plates 27, 28 are formed with openings 31, 32 respectively. The extension 29 is formed with an opening 33 which aligns with but is of less diameter than the opening 21. The extension 30 is formed with an opening 34 which aligns with the opening 22. The plates 27, 28 conform in contour to the rear end terminal portions of the side cheeks 15, 16.

The plates 27, 28 are formed with spaced parallel like annular channels 35, 36 respectively of less diameter than the height thereof. The upper portions of these channels are arranged in proximity to the top member 17. The rear portions of these channels are spaced forwardly of the rear ends of the plates 27, 28. These latter are formed lengthwise thereof with spaced parallel like grooves 37 inclining upwardly from rear to front and extending across the lower portion of the channels 35, 36. The grooves 37 are of a length to extend through the extensions 29, 30. The forward end of the grooves 37 register with the rear ends of parallel spaced grooves 38 formed in the inner faces of the side cheeks 15, 16. The grooves 28 are disposed at the same inclination as the grooves 37.

Mounted in the grooves 37, 38 is a cartridge suspension and guide element 39 which extends from a point forwardly of the rear end of the grooves 37 to the forward end of the grooves 35. The element 39 is of inverted channeled contour formed with oppositely disposed inwardly extending flanges at the bottom of its sides. The forward end of element 39 is at the forward end of the part 9 of the stock and the flanged sides register with the guides 13, 14 formed in the part 8 of the stock. The guides 13, 14 form flush continuations of the flanged sides of the element 39. The latter, on the portion thereof which is arranged in the grooves 37, has rigidly secured thereto a pair of blocks 40, only one shown. These blocks 40 are rigidly secured to the plates 27, 28. The top of the rear end terminal portion of the element 39 is cut out, as at 40, to provide a clearance for a purpose to be referred to. The element 39 divides the part 9 of the stock into a lower chamber and an upper chamber. The lower chamber coacts with the part 8 of the stock to provide a part of the magazine 3. The upper chamber is indicated at 41, is of triangular contour and is adapted to receive the cartridge pusher or feeder mechanism, to be referred to, when such mechanism is inactive and it is also employed for permanently receiving a stretch of the pulling element, to be referred to, for such mechanism. The upper chamber 41 communicates at its forward end with the magazine 3 adjacent the rear end of the part 8 of stock 2. The chamber 41 opens at its rear into the rear end of magazine 3.

The members 17, 18 not only provide closures for the top and bottom respectively of the part 9 of the stock, but also spacers for the side cheeks 15, 16. The cheeks 15, 16, members 17, 18 and plates 27, 28 are rigidly secured together by the holdfast devices 42. The plates 27, 28 are also secured to the inner faces of the cheeks 15, 16 by the holdfast devices 43. The top member 17 has a depending curved end terminal portion 44 arranged between the upper portion of the rear ends of the plates 27, 28. The end edge 45 of the member 17 constitutes the top wall of a door opening for the magazine 3. The rear end edge 46 of bottom member 18 is spaced forwardly from the rear ends of plates 27, 28 and provides the bottom wall of the door opening for the magazine 3. That portion of the plates 27, 28 arranged between the said ends 45, 46 constitute the side walls of the door opening for the magazine 3. The door opening is indicated at 47, Figures 3, 4 and 10. A curved spring controlled, automatically latchable and releasable door 48 is arranged between the plates 27, 28 and is employed for closing the entrance to the magazine 3. The said entrance is formed by the opening 47. The door 48 is mounted at one end upon a pivot 49 arranged in close proximity to the end edge 46 of member 18. The other end of the door 48 slidably engages the end edge 45 of member 17 when the door is in closed position. Attached to the inner face of the door 48, as at 50, is one end of a curved controlling spring 51 normally tending to project the door from opening 47. The spring 51, when door 48 is closed, bears against an abutment 52 carried by plates 27, 28. The abutment 52 is arranged above the grooves 37. The inner face of door 48, in proximity to its non-pivoted end, is formed with a nose 53 for engagement by a pivoted spring controlled upstanding automatically releasable latching member 54 for holding the door 48 closed. The member 54 (Figure 16) includes a rectangular body 55 formed at its lower end with a rearwardly directed hook 56 and at its upper end with an upstanding forwardly curved shank 57. The upper end of body 55, at each side of the lower end of shank 57, is formed with a rearwardly directed barrel 58. The barrels 58 are loosely mounted on a pivot shaft 59 carried by the plates 27, 28. Secured to the inner face of the terminal portion 44 of member 17, as at 60, is a controlling spring 61 for the latching member 54. The spring 61 permanently bears against the rear face of shank 57 and tends to shift member 64 on its pivot in a direction for the hook 56 to engage nose 53 to latch door 48, as shown in Figure 10.

Anchored within, as well as extending outwardly from the openings 19, 20, is a pair of oppositely disposed spaced parallel caps 62, 63 respectively, having axial openings 64 surrounded by bosses 65 arranged on the inner faces of the caps. Journaled in the openings 64 are the ends of a power transmitting shaft 66 which is driven from a spring motor 67 arranged within a revoluble drum 68 disposed in chamber 41. The drum 68 revolves about shaft 66. The motor 67 is in the form of a windable and unwindable coiled power transmitting spring 69 which encompasses and has one end fixed to shaft 66. The spring 69 has its other end fixed to drum 68. The latter is arranged between the caps 62, 63, abuts the boss 65 on cap 62 and is spaced from the boss 65 on cap 63. The sides of the drum 68 are axially apertured, as at 70, for the passage of shaft 66. Interposed between drum 68 and the boss 65 of cap 63, as well as being fixedly secured to shaft 66 to bodily move with the latter, is a grooved power transmitting pulley 71. The body of drum 68 has its outer periphery formed with a pair of spaced annular ribs 72 to form the drum 68 with a circumferential groove 73. The cut out top 40 of the rear terminal portion of element 39 forms a clearance for the bottom of drum 68.

Winding off and on the drum 68, relative to groove 73, is a flexible pulling element 74 upon which is attached a flexible cartridge pusher or feeding device or mechanism 75. The element 74 is of strap or tape-like form and has one end attached to drum 68 within groove 73. The element 74, when winding off the drum 68, travels through the element 39 to cause the device 75 to feed the cartridges. The element 74 winds on the drum 68 on the return of the device 75 to its initial position. The element 74 travels from the rear portion of chamber 41 into and through the element 39 and from the latter into the forward end of and rearwardly in chamber 41 on the feeding of the cartridges. After all the cartridges have been shifted into the part 8 of the stock 2, the device 75 is shifted rearwardly relative to element 39 and element 74 is returned to the full line position shown in Figure 11. The rearward shift or travel of element 74 relative to element 39 is provided by the winding up of the spring motor 67 by a means to be referred to.

The device 75 consists of a curved leading carriage 77 provided with a friction roller 78 projecting outwardly therefrom, a pusher member 79 secured to the leading end of carriage 77 and extending outwardly from said end at an angle thereto, a set of spaced curved follower carriages 80 provided with friction rollers 81 projecting outwardly thereof, a set of spaced curved links 82 arranged between and pivotally connected at their ends to the follower carriages 80 and a curved link 83 pivotally connected to the front end of the leading carriage of said set of follower carriages 80 and to the rear end of carriage 77. The ends of the carriages are bifurcated and the links are extended into the furcations. The carriages, when the device 75 is inactive, are positioned against the ribs 72 and ride against these latter when the device 75 is moved from and to inactive position. The carriages have side flanges 84 which ride on the upper faces of the inturned side flanges of the element 39 during the feeding of the cartridges and when the device 75 is returned to its initial position.

There is associated with the latching member 64 a shiftable releasing device 85 therefor which functions to release member 64 when the device 75 is being returned to its initial position, as shown in Figure 4. The device 85 consists of a band 87, of a contour greater than a half circle, which travels in the channels 35, 36. The rear end of band 87 has an extended reduced curved projection 88. The forward end of band 87 is squared. The friction rollers 75, 81 bear against the inner face of the device 85 when the device 75 is in the position shown in Figure 10. The band 87, on its outer face, has a protuberance 89 for engaging stem 57 and rocking member 54 to move hook 56 clear of nose 53 to permit spring 51 to shift door 48 open so that access may be had to the rear end of magazine 3 to enable the loading of the latter with cartridges. When the device 75 is moved from the position shown in Figure 10 it carries the band 87 therewith in a direction to have protuberance 89 clear shank 57 whereby member 74, due to spring 61, will be carried with device 75 until its edge 90 arrives at the closed portion 91 of the channels 35, 36. At this point a spring controlled latching device 92 will engage the edge 93 (Figure 10) of band 87 and act to prevent the latter being shifted accidentally in the other direction until it is moved in such direction on the return of the device 75 to its initial position. The device 92 is arranged forwardly of band 87 and is mounted at one end on a pivot 94 carried by plates 27, 28. The controlling spring of device 92 is indicated at 95. The device includes a curved offset portion 96 to engage edge 93 of band 87. The device 92 is arranged in chamber 41. On the return of the device 75 to its initial position (Figure 4) the pusher member 79 engages the projection 88 and causes the band 87 to move from the position shown in Figure 10 to that shown in Figure 4. As the band 87 is moved by the pusher member 79, the protuberance 89 will ride against shank 57 and will release and hold latching member 54 in released position relative to nose 53, and in this connection attention is directed to Figure 4.

The pulling element 74, when operating to pull the device 75 for the purpose of feeding the cartridges, is wound on a winch 97 which is operated, during the firing of the gun, from the pulley 71 by a power transmitting strap 98. The winch 97 includes means for driving the strap 98 for the purpose of operating the pulley 71 in a direction for winding up the spring motor 67 and thereby unwinding the element 74 from off the winch and shifting the device 75 to its initial position, Figure 4. The winch 97 includes a cap 98a which is arranged within and extends outwardly from opening 23. The cap 98a extends into the opening 34 formed in the extension 30. The cap 98a is anchored to cheek 16 and is formed with an axial opening 99 and a boss 100 on its inner face surrounding opening 99. Arranged within and extending inwardly from opening 99 is a bearing sleeve 101. Mounted in the opening 33 of the extension 29 and extended outwardly and inwardly with respect to the latter is a tubular bearing 102 formed with a peripheral annular shoulder 103 which, at its outer side, abuts the inner face of extensions 29. Positioned against the boss 100 is a grooved pulley 104 of greater diameter than pulley 71 and which functions as a driven pulley during the cartridge feeding operation and as a driving pulley when the cartridge feeding device 75 is being returned to its initial position. The pulley 104 includes inner and outer webs 105, 106 respectively. The web 105 has an axial opening 107 for the purpose of revolubly mounting pulley 104 on the sleeve 101 (Figures 6 and 7). The web 106 is in the form of an annulus having its inner edge threaded, as at 108. The said inner edge of the web 106 is arranged outwardly relative to the opening 107 in web 105. The inner diameter of the web 106 is materially greater than the diameter of opening 107. Formed integral with the web 106 is an internally threaded collar 109 projecting towards the extension 29 on plate 27 and having its threads forming a continuation of the threads 108. Mounted on the bearing 102 and having one side abutting the other side of shoulder 103 is a grooved drum 110 which extends from the inner end of bearing 102 and revolves on the latter during the cartridge feeding operation. The drum 110 at its other side is formed with an annular flange 111 having its outer face threaded, as at 112. The flange 111 has a reduced outer edge portion 113 formed with spaced teeth 114 constituting a clutching edge. The internally threaded collar 109 of the pulley 104 threadedly engages with the threads of the flange 111 for securing the drum 110 and pulley 104 together so they will revolve in unison when the drum 110 is driven clockwise and anticlockwise. The front edge of shoulder 103 of bearing 102 if formed throughout with ratchet teeth 115 for a purpose to be referred to. A manually rotatable shaft 116 is extended through opening 21 in the cheek 15, through bearing 102 and into sleeve 101. The shaft 116 is fixedly secured to sleeve 101 by a pin 117. The shaft 116 is formed of a circular part 118 recessed in its outer face, a cylindrical part 119, a worm part 120 and a cylindrical part 121 of less diameter than the part 119. The worm part 120 is interposed between the parts 119, 121. The outer end of part 119 merges into the inner face of part 118. The latter abuts the outer end of bearing 102. Threadedly engaging with the worm part 120 of shaft 116 is an interiorly threaded adjustable flanged coupling collar or nut 122 having its flange 123 opposing the web 105 and formed with spaced teeth 124 to coact with the teeth 114 to clutch the drum 110 to shaft 116 whereby when the latter is rotated, the drum 110 and pulley 104 will be driven from shaft 116. The latter is not rotated when pulley 104 is opearted from the transmission strap 98. Surrounding the shaft 116 and interposed between bearing 102 and collar 122 is a coiled spring 125 normally tending to hold the collar 122 out of mesh with the teeth 114. The normal position of collar 122 is as shown in Figure 6 and it is moved into clutching engagement relative to the teeth 114 on the clockwise movement of shaft 116. Pivotally connected to and seated in the recessed outer face of the shaft part 118 is the end 126 of a crank handle 127. The pivoted connection between handle 127 and shaft part 118 is indicated at 128. The side cheek 15 is grooved, as at 129, to receive handle 127 when the latter is in non-extended position. The crank portion of handle 127 is at the end 129 of the latter, is indicated at 130 and is for extension through an opening 131 in cheek 15 to engage a resilient latching device 132 arranged in chamber 41 and anchored to the side cheek 16.

The top member 17, in proximity to its forward end, is formed with an opening 133 which registers with an opening 134 provided in the top of element 39. Secured, as at 135, 136, to the member 17 is an upstanding open bottom casing 137 which provides a chamber 138 communicating through the openings 133, 134 with the magazine 3 and through a slot 139 formed in member 17 with the chamber 41. Rotatably supported by the sides of the casing 135 and arranged within the chamber 138 is a guide pulley 140. The latter extends into the opening 133. The pulling element 74, during the cartridge feeding operation, travels from the element 39, through the openings 133, 134 into the chamber 138, against the bottom edge, upwardly against the forward edge and rearwardly over the top edge of pulley 140 and thence rearwardly through slot 139 into chamber 41 and winds on the drum of winch 67. When the device 75 is moved to its initial position in chamber 41, the pulling element 74 winds off winch 67, travels forwardly through slot 139, over the top edge, downwardly on the front edge and rearwardly against the bottom edge of pulley 140, thence into element 39, rearwardly in the latter and from the rear end of element 39 into chamber 41 and winds on the drum 68.

The pulling element 74 has its upper face provided with means, as at 141, to constitute consecutively numbered indicators to indicate the number of cartridges which have been fired and such indicators are successively visible through a slot 142 formed in the top of casing 137.

The top member 17, at its forward end, is formed with a pair of spaced parallel apertured ears 143, only one shown, and arranged between them is an apertured extension 144 on the rear end of the rear side of part 8 of stock 2. Extending through the ears 143 and extension 144 is a coupling or connecting means 145. The bottom member 18, at its forward end, is cut out, as at 146, and secured within and extending outwardly from the cutout 146 is a shock absorber 147. The latter includes a laterally disposed block 148 having its inner part anchored in cutout 146. The outer part of block 148 has formed in its top a socket 150, in its bottom a socket 151 and a bore 152 connecting the sockets together. Extending through the sockets and bore is the shank of a headed bolt 153. The head of the latter is arranged in socket 150. Surrounding the shank of bolt 153 and interposed between the head of the latter and the base of socket 150 is a resilient or cushioning member 154. The lower end of bolt 153 carries a holding nut 155 and surrounding the shank of bolt 153 and interposed between the nut 155 and base of socket 151 are superimposed resilient or cushioning members 156. The head of the bolt 153 has extending outwardly therefrom an apertured ear 157.

The rear end of the forward side of the part 8 of the stock 2 has fixedly secured thereto a laterally extending block 158 formed with a pair of spaced parallel apertured ears 159, only one shown. The ear 157 is positioned between the ears 159 and said ears 157, 159 have extending therethrough a coupling or connecting means whereby the part 8 is not only coupled to part 9, but is also coupled to the shock absorber 143. The latter has the bolt 153 thereof disposed at an opposite inclination with respect to the inclination of part 8 of stock 2, whereby bolt 153, when acting, in connection with the members 154, 156, to absorb shock, will shift in a plane intersecting the plane of the part 8 of the stock 2.

The cartridge clip 4 for use in loading the magazine (Figure 20) will be of a capacity preferably for holding forty cartridges. The clip consists of a channel-shaped body 161 of the desired length and width, having its body cut out at each side of one end terminal portion to form a resilient tongue 162 which normally inclines from its inner to its outer end in a direction towards the inwardly extending flanges 163 on the sides of the clip. The other end of the body of the clip is formed with a stop flange 164. When the cartridges 165 are mounted in the clip 4, they are held therein by the coaction of tongue 162 with the flange 163. The sides of clip 160 in cross section conform to the sides of the guide element 39. When loading the magazine, the clip with the cartridges 165 suspended therefrom is extended into the magazine 3 from the rear of the latter to register with the rear end of guide 39. The cartridges 165 are forced from off the clip at the forward end of the latter, which is that end provided with the tongue 162. As the cartridges are forced off the clip, the tongue 162 is elevated to enable the cartridges to clear the latter and enter the rear end of guide 39 which suspends the cartridges in that portion of the magazine in the part 9 of the stock 2, and with the cartridges clear of the sides and bottom of the said portion of the magazine.

The shaft 66 is connected with the winch 97 in a manner whereby the latter will be operated in an anticlockwise direction from said shaft 66 when the latter is driven from the spring motor 67. The shaft 66, when operated from said motor 67, moves in a clockwise direction. Due to the diameters of the pulleys 71, 104 relative to each other and the diameter of the drum 68 being greater than that of pulley 71, there is a differential ratio set up which causes the winch 97 to wind thereon the pulling element 74, thus pulling the device 75 into the magazine and during such action the motor 67 operates shaft 66 in a clockwise direction and provides for pulling the element 74 from off drum 68 at a slower speed than that of shaft 66. When the feeder or pusher device 75 has traveled to the front end of the magazine 3, the handle 127 is extended and operated in a direction to rotate shaft 116 to an extent to provide for collar 122 clutching the drum 110 of winch 97 to shaft 116. When winch 97 is coupled to shaft 116 the handle 127 is turned in a clockwise direction carrying shaft 116 in a like direction whereby the drum 110 and pulley 104 are revolved by shaft 116 in a clockwise direction whereby the transmission strap 98 will operate shaft 66 in an anticlockwise direction and wind up the spring motor. A spring controlled pawl 166 is carried by the extension 29 of plate 27 and coacts with the teeth 115 to arrest the winch moving anticlockwise when shaft 116 is operated clockwise from the handle 127. When the winch 97 is operated in a clockwise direction it unwinds therefrom the pulling element 74 and permits the element 74 being wound on drum 68 to an extent to shift the device 75 from out of the magazine 3 into the chamber 41 and around drum 68 to the position shown in Figure 4.

Any suitable means may be employed for latching the spring motor from operating to drive shaft 66.

The rear of part 9 of the stock 2 is provided with loops or hooks 167 for connecting a shoulder strap, not shown, therewith.

The strap 98 is connected at its ends to the pulleys 71, 104, alternately winds off pulley 71 and on pulley 104 when the spring motor operates shaft 66 and alternately winds on pulley 71 and off pulley 104 when the winch is manually operated.

With reference to Figure 26, the modified form of cartridge magazine door is generally indicated at 167a and does not include the sections 168, of the sides of body 2, which form parts of the door 48. The sides 168a (only one shown) of the body of the stock as illustrated in Figure 26 are not formed with the shiftable sections 168 at their rear ends. The door 167a consists of a strip 169 of the desired length and form arranged between the rear ends of the sides 168 and of a length to extend in close proximity to the rear ends of the top and bottom 169a, 169b respectively, of the body of the stock. The strip 169 is mounted at its lower end on a pivot 170 carried by the sides 168a. The inner face of door 167 will be formed in the same manner as the inner face of door 48. The door 167 will be automatically opened and latched in the same manner as the door 48.

Figures 27 to 31, both inclusive, illustrate a modified form of door structure and with reference thereto, the body 171 of the stock is shown as including a pair of side walls or cheeks 172, 173, a top wall 174 and a bottom wall 175. The walls 174, 175 are arranged between the walls 172, 173. The said several walls are secured together by the holdfast means 176. The rear end of wall 174 is spaced from the rear end of wall 175. Arranged between the walls 172, 173 in the space between the rear ends of the walls 174, 175 is a combined door opening former and slidable door housing means 176a formed of a pair of oppositely disposed strap-like segmental shaped members 177, 178 of like form. Each of said members includes a narrow lower part 179 of inwardly opening channel-shaped form, an intermediate lower part 180 of inwardly opening channel-shape form of greater width than part 179 and having its inner flange 181 of less width than its outer flange 182, an upper intermediate part 183 of inwardly opening channel-shape form of greater width than the part 179 and having its inner and outer flanges 184, 185 respectively of the same width, an upper terminal part 186 having its lower edge grooved as at 187 and of greater width than part 179, and a lower terminal part 188 formed in its rear edge with a groove 188a and of greater width than part 179. The part 188 merges into the lower end of part 179. The part 180 merges into the upper end of part 179. The part 183 merges into the upper end of part 180 and the part 186 merges into the upper end of part 183. The part 179 is of greater length than any of the other of said parts. The part 183 is of greater length than the parts 180, 187, 188. The parts 180, 187, 188 are substantially of the same length and of materially less length than parts 179, 183.

The parts 179 of said members coact to provide a door opening 189 extending from the part 188 to the part 180. The outer flanges 182 of the part 180 abut. The flanges 181 of the part 180 are arranged in aligned spaced relation to form a slot 190 extended upwardly from the upper end of opening 189. The slot 190 has its lower end open and communicates with the upper end of the door opening 189. The inner and outer flanges 184, 185 of the parts 183 abut and form in connection with the flanges of the parts 180 a door receiving chamber 191 communicating at its lower end with the upper end of the door opening 189. The upper end of chamber 191 is closed by the grooved lower edge 187 of part 186.

Slidably mounted in the means 176a is a door 192 for closing the door opening 189. When the door is in closed position, it is arranged in the parts 179 of the members 177, 178 and its lower end seats in groove 189a. When the door is shifted to open position, it is moved into chamber 191 and its upper end seats in groove 187. The door is shifted manually to closed position and automatically to open position and to these ends respectively, the lower end of the door has extending outwardly therefrom a handle 193 and has extending inwardly therefrom, in proximity to its lower end, an abutment 194. The latter is arranged in the return path of the pusher member 79. The slot 190 provides a clearance for the abutment 194 when the door is shifted to open position by the member 79. The inner flange 195 of the parts 179 of the members 177, 178 are cutout as at 196 to form continuations of the grooves 37.

With reference to Figures 32 to 35 both inclusive, is a modified form of the leading part of the body 2. In these figures the said part is indicated at 197 and the form of the latter is such as to cause the cartridges before discharge to shift from their inclined positions into a horizontal position. The part 197 is permanently open at its outer or forward end and it includes a bottom wall 198, a top wall 199, a pair of side walls 200, 201 and the cartridge guide means 202 arranged inwardly of and in close relation to the wall 199. The wall 198 has its forward end positioned rearwardly of and in spaced relation to the forward ends of the walls 200, 201 whereby the forward end of the bottom of part 197 is formed with a cutout or opening 203. The forward end of wall 199 is arranged in forward relation with respect to the forward end of wall 198, but it is spaced rearwardly from the forward ends of the walls 200, 201 whereby the forward end of the top of the part 197 is formed at its forward end with a cutout or opening 204 of less depth than the cutout or opening 203. The latter forms a clearance for the cartridges when they are turned from their inclined position into a horizontal position. The cutout or opening 204 provides a clearance to permit of the cartridges turning or tilting from their inclined position into a horizontal position and to be discharged in such latter position. The wall 199 extends a short distance forwardly from the means 202, as at 205. The portion 205 is to be of less length than that of the diameter of the inner end of the cartridge shell. The forward end edge 206 of the wall 199 provides a fulcrum upon which the cartridges tilt, turn or fulcrum when moving from inclined position to horizontal position. As the cartridges are pushed or fed by the pusher mechanism the leading cartridge will be shifted clear of the means 202 onto and moved forwardly of the portion 205 until it reaches edge 206. The latter will then provide for the cartridge to fulcrum from an inclination to a horizontal position as the pressure from the cartridge pusher or feeder mechanism is continued.

With reference to Figures 36, 37 and 38, a modified form of cartridge pusher or feeder mechanism is disclosed and indicated generally at 208. Mechanism 208 includes a set of channel-shaped members 209 arranged in spaced tandemwise relation, a set of spaced links 210 alternately disposed with respect to the members 209, extending into the latter and pivotally connected to the ends of members 209, as at 211. The leading member 209 has connected to its forward end, as at 211 the inner end of a pusher 212. The latter is disposed at right angles to said leading member 209. The leading link 210 is formed with a stop 213 and interposed between the latter and the pusher 212 is a curved spring 214, attached as at 215 to pusher 212. The flexible pulling element 74 is attached to the leading and follower members 209.

The stock may or may not be provided with a vibration absorbing device for the flexible pulling element 74 and such device is to be arranged in the chamber 41 and suspended from the top member 17 forwardly of the winch. The said device will be of the form and arrangement as shown in Figures 39 and 40, is indicated generally at 216 and includes inverted V-shaped parallel spaced brackets 217 of like form having at their forward ends upwardly inclined extensions 218. The brackets 217 are pivotally suspended, as at 219 from the rear end of a plate 220 anchored to the inner face of top member 17. Anchored to the forward end of plate 220, as at 221 is a rearwardly extending tensioning spring 222 which permanently bears on the extensions 218. Revolubly carried by, arranged between and depending from the brackets 217 is a pair of spaced tandemwise arranged pulleys 223, 224. The element 74 rides against the bottom of pulley 223 and the top of pulley 224.

What I claim is:

1. An extension stock for a firearm of that type having a hollow handle, said stock including an elongated hollow body for extension into and for projecting rearwardly from said handle, said body providing from end to end thereof a cartridge magazine permanently open at its leading end for the passage of cartridges therefrom into the firearm, said magazine being open at its follower end for reloading, said body formed of a separate leading and a separate follower part disposed in endwise relation, coacting means arranged at the rear end of said leading part and at the forward end of said follower part and including a shock absorber for connecting said parts together in endwise abutting relation, and a normally latched releasable means for normally closing the follower end of the magazine.

2. An extension stock for a firearm of that type having a hollow handle, said stock including an elongated hollow body for extension into and for projecting rearwardly from said handle, said body providing from end to end thereof a cartridge magazine permanently open at its leading end for the passage of cartridges therefrom into the firearm, said magazine being open at its follower end for reloading, said body formed of a separate leading and a separate follower part disposed in endwise relation, coacting means arranged at the rear end of said leading part and at the forward end of said follower part and including a shock absorber for connecting said parts together in endwise abutting relation, a normally latched releasable means for normally closing the follower end of the magazine, said leading part being disposed upwardly at a forward inclination relative to said follower part, a cartridge guide element arranged in said follower part and forming a top wall for that portion of the magazine in such part, said leading part having spaced parallel inherent continuous portions lengthwise thereof extending from its rear end to a point rearwardly of its forward end and forming spaced parallel continuations of said element, and that portion of the magazine in said follower part disposed at a downward inclination from front to rear.

3. An extension stock for a firearm of that type having a hollow handle, said stock including an elongated hollow body for extension into and for projecting rearwardly from said handle, said body providing from end to end thereof a cartridge magazine permanently open at its leading end for the passage of cartridges therefrom into the firearm, said magazine being open at its follower end for reloading, said body formed of a separate leading and a separate follower part disposed in endwise relation, coacting means arranged at the rear end of said leading part and at the forward end of said follower part and including a shock absorber for connecting said parts together in endwise abutting relation, a normally latched releasable means for normally closing the follower end of the magazine, said leading part being disposed upwardly at a forward inclination relative to said follower part, a cartridge guide element arranged in said follower part and forming a top wall for that portion of the magazine in such part, said leading part having spaced parallel inherent continuous portions lengthwise thereof extending from its rear end to a point rearwardly of its forward end and forming spaced parallel continuations of said element, that portion of the magazine in said follower part disposed at a downward inclination from front to rear, and a revoluble cartridge trip within and journaled in the sides of said leading part and disposed at right angles to the length of the cartridge, said trip being arranged in close proximity to the upper portion of the inner face of the rear side of said leading part immediately forward of said inherent continuous portion.

4. In an extension stock for the purpose set forth, a body providing a cartridge magazine permanently open at its leading end and open at its rear end for reloading, a door for closing said rear end, an automatically operable latching device for normally maintaining the door in closing relation with respect to said rear end, a cartridge pusher device traveling into and out of said magazine for discharging the cartridges therefrom, an oppositely shiftable controlling means for said latching device, said means being arranged relative to the pusher device to be shifted in one direction by said pusher device as the latter moves in a direction to enter the magazine to provide for the latching device to automatically latch the door in closing relation with respect to the rear end of said magazine and in the opposite direction when said pusher device moves in a direction out of the magazine to shift said latching device in a direction to release the door, and means to provide for the traveling of the pusher device in opposite directions.

5. In an extension stock for the purpose set forth, a body providing a cartridge magazine permanently open at its leading end and open at its rear end for reloading, a door for closing said rear end, an automatically operable latching device for normally maintaining the door in closing relation with respect to said rear end, a cartridge pusher device traveling into and out of said magazine for discharging the cartridges therefrom, an oppositely shiftable controlling means for said latching device, said means being arranged relative to the pusher device to be shifted in one direction by said pusher device as the latter moves in a direction to enter the magazine to provide for the latching device to automatically latch the door in closing relation with respect to the rear end of said magazine and in the opposite direction when said pusher device moves in a direction out of the magazine to shift said latching device in a direction to release the door, means to provide for the traveling of the pusher device in opposite directions, and means for controlling the movement of the latching device controlling means in opposite directions.

6. In an extension stock for the purpose set forth and of that type including a cartridge magazine and a cartridge pusher device for discharging the cartridges from the magazine, the combination of an oppositely shiftable pulling element extending into said magazine for said device, a winch mechanism including an oppositely revoluble member upon which said element winds on and off, a revoluble drum upon which said element winds off and on, an oppositely rotatable shaft upon which said drum revolves, an oppositely movable transmission leading from said shaft to said member, a windable spring motor connected to said shaft and drum to provide respectively for the operation of the latter in a direction to wind off said element, the operation of said shaft in a direction to drive said transmission in a direction to operate said member in a direction to wind said element thereon, and said mechanism including rotatable means for clutching to said member to provide respectively for the operation of said member in a direction to wind off said element, the operation of said transmission in the opposite direction to drive said shaft in the opposite direction for winding up the spring motor thereby causing the revolving of said drum in the opposite direction to wind said element thereon.

7. In an extension stock for the purpose set forth and of that type including a cartridge magazine and a cartridge pusher device for discharging the cartridges of the magazine, the combination of an oppositely shiftable pulling element extending into said magazine, an oppositely revoluble structure for winding off and on said element and including a windable spring motor for revolving said structure in a clockwise direction to wind off said element, a winch mechanism including a revolving member for winding on and off of said element, transmission means operated from said motor, during the winding off of said element from said revolving structure for revolving said member in a direction to wind said element thereon, and said mechanism including revoluble horizontally shiftable parts inactive during the winding on of said element on said member, said parts, when shifted, clutching said members therewith and when revolved driving said transmission means in a direction to provide respectively for the winding off of said element from said member, the winding on of said element on said structure and the winding up of the spring motor.

8. In an extension stock for the purpose set forth, a hollow body providing a cartridge magazine lengthwise thereof, said body including a separate leading part and a separate follower part, said parts disposed in endwise aligned relation, means for connecting said parts together in endwise abutting relation, a laterally disposed shock absorber anchored in one of the walls of the forward terminal portion of said follower part, and means for connecting said shock absorber to the means for connecting said parts together.

9. In an extension stock for the purpose set forth, a hollow body formed of an upwardly disposed inclined separate part open at its upper end for cartridge discharge and a triangular separate part extending rearwardly from the inclined part and having an opening at its rear end for cartridge loading, said parts being disposed in endwise alignment, means for connecting said parts together in endwise abutting relation, said parts forming a cartridge magazine extending from the forward end of the inclined part to the rear end of the triangular part, said magazine having an upstanding inclined portion and a rear portion extending downwardly at an inclination from said forward portion, means in said magazine for guiding cartridges respectively at an inclination to the perpendicular and at an inclination to the horizontal, and a horizontally disposed roller within, mounted in the side walls of and in close proximity to the upper end of said inclined part immediately forward of said guide means for shifting the cartridges from an inclination to the horizontal to the horizontal immediately preceding the discharge of the cartridges from the open upper end of said inclined part, said roller being disposed at right angles to the length of the cartridges.

10. In an extension stock for the purpose set forth, a hollow body formed of an upwardly disposed inclined separate part open at its upper end for cartridge discharge and a triangular separate part extending rearwardly from the inclined part and having an opening at its rear end for cartridge loading, means for connecting said parts together in endwise abutting relation, said parts forming a cartridge magazine extending from the forward end of the inclined part to the rear end of the triangular part, said magazine having an upstanding inclined portion and a rear portion extending downwardly at an inclination from said forward portion, means in said magazine for guiding cartridges respectively at an inclination to the perpendicular and at an inclination to the horizontal, said guide means having its forward end spaced rearwardly of the forward end of said inclined part, a horizontally disposed roller within, journaled in the sides of and arranged in close proximity to the upper end of said inclined part immediately forward of said guide means for shifting the cartridges from an inclination to the horizontal to the horizontal immediately preceding the discharge of the cartridges from the open upper end of said inclined part said roller being disposed at right angles to the length of the cartridges, a pusher device operating in said parts for pushing the cartridges through the magazine, operating means for said pusher device arranged in said triangular part, an automatically operable door for closing the opening in the rear end of the triangular part, and an oppositely shiftable controlling element for said door having its movement controlled by said pusher device.

11. In an extension stock for the purpose set forth, a hollow body formed of an upwardly disposed inclined separate part open at its upper end for cartridge discharge and a triangular separate part extending rearwardly from the inclined part and having an opening at its rear end for cartridge loading, means for connecting said parts together in endwise abutting relation, said parts forming a cartridge magazine extending from the forward end of the inclined part to the rear end of the triangular part, said magazine having an upstanding inclined portion and a rear portion extending downwardly at an inclination from said forward portion, means in said magazine for guiding cartridges respectively at an inclination to the perpendicular and at an inclination to the horizontal, said guide means having its forward end spaced rearwardly of the forward end of said inclined part, a horizontally disposed roller within, journaled in the sides of and arranged in close proximity to the upper end of said inclined part immediately forward of said guide means for shifting the cartridges from an inclination to the horizontal to the horizontal immediately preceding the discharge of the cartridges from the open upper end of said inclined part, said roller being disposed at right angles to the length of the cartridges, a pusher device operating in said parts for pushing the cartridges through the magazine, operating means for said pusher device arranged in said triangular part, an automatically operable door for closing the opening in the rear end of the triangular part, and an oppositely shiftable controlling element for said door having its movement controlled by said pusher device, said operating means providing for the traveling of said pusher device in opposite directions and being formed with spaced indicators to designate the number of the cartridges discharged from the magazine, and means on the top of the forward terminal portion of said triangular part for successively exposing said indicators.

12. In an extension stock for the purpose set forth, a cartridge magazine permanently open at its forward end for the discharge of the cartridges therefrom and opening at its rear end for reloading, a spring controlled door for closing the reloading opening, a cartridge pusher device for traveling in one direction in said magazine for pushing the cartridges out of the forward end of the magazine and for traveling in the opposite direction out of the magazine, means for operating the said device, an automatically operable spring controlled latching member engageable with the door for releasably maintaining the latter to close said reloading opening, and an oppositely shiftable split band carrying a protuberance controlling said latching member, said band being shiftable in a clockwise direction from and as the pusher device moves into the magazine to provide for said protuberance clearing the latching member to permit of the activity of the latter and in an anticlockwise direction from and as the pusher device moves out of the magazine to provide for said protuberance shifting said member from active position to release the door.

13. In an extension stock for the purpose set forth, a cartridge magazine permanently open at its forward end for the discharge of the cartridges therefrom and opening at its rear end for reloading, a spring controlled door for closing the reloading opening, a cartridge pusher device for traveling in one direction in said magazine for pushing the cartridges out of the forward end of the magazine and for traveling in the opposite direction out of the magazine, means for operating the said device, an automatically operable spring controlled latching member engageable with the door for releasably maintaining the latter to close said reloading opening, an oppositely shiftable split band carrying a protuberance controlling said latching member, said band being shiftable in a clockwise direction from and as the pusher device moves into the magazine to provide for said protuberance clearing the latching member to permit of the activity of the latter and in an anticlockwise direction from and as the pusher device moves out of the magazine to provide for said protuberance shifting said member from active position to release the door, and means to prevent the shifting of the band anticlockwise until the band is shifted in such direction when the pusher device moves out of the magazine.

14. An extension stock for a firearm of that type having a hollow handle, said stock including an elongated hollow body for extension into and for projecting rearwardly from said handle, said body providing from end to end thereof a cartridge magazine permanently open at its leading end for the passage of cartridges therefrom into the firearm, said magazine being open at its follower end for reloading, said body formed of a separate leading and a separate follower part disposed in endwise relation, means for connecting said parts together in endwise abutting relation, a shock absorber carried by said follower part and connected to the connecting means between said parts, and an automatically operable means for normally closing the follower end of the magazine.

15. An extension stock for a firearm of that type having a hollow handle, said stock including an elongated hollow body for extension into and for projecting rearwardly from said handle, said body providing from end to end thereof a cartridge magazine permanently open at its leading end for the passage of cartridges therefrom into the firearm, said magazine having a closable follower end for reloading, said body formed of a separate leading and a separate follower part disposed in endwise relation, means for connecting said parts together in endwise abutting relation, and a shock absorber connected to and extended from said follower part and being connected to the connecting means between said parts.

16. An extension stock for a firearm of that type having a hollow handle, said stock including an elongated hollow body for extension into and for projecting rearwardly from said handle, said body providing from end to end thereof a cartridge magazine permanently open at its leading end for the passage of cartridges therefrom into the firearm, said magazine having a closable follower end for reloading, said body formed of a separate leading and a separate follower part disposed in endwise relation, means for connecting said parts together in endwise abutting relation, said follower part being cut out, a shock absorber arranged in said cutout, connected to and extended laterally from said follower part and being connected to the means for connecting said parts together, and means for indicating the number of the non-fired cartridges in the said magazine.

17. An extension stock for firearms of that type having a hollow handle, said stock including an elongated hollow body for extension into and projection rearwardly from said handle, said body being formed with a cartridge magazine opening into said handle and consisting of a separate leading part and a separate follower part arranged in endwise alignment, means for connecting said parts together in endwise abutting relation, said follower part being provided with a cutout, a block arranged within said cutout, connected to and extended laterally from said follower part, a shock absorber means within said block, and means extending through said block and shock absorber means for connecting the latter with the connecting means of the said parts.

18. In an extension stock for the purpose set forth and of that type including a cartridge magazine, a chamber opening into said magazine and a cartridge pusher device for discharging the cartridges from the magazine, said device travelling from said chamber into said magazine and from said magazine into said chamber, the combination of an oppositely shifting pulling element extending from said chamber into said magazine and from said magazine into said chamber, an oppositely revolving structure arranged in said chamber for winding off and on said element and including a windable spring controlled motor revolving said structure in a clockwise direction to wind off said element, a winch mechanism arranged in said chamber and including a revoluble member for winding on and off of said element, transmission means operated from said motor, during the winding off of said element from said revolving structure and revolving said member in a direction to wind said element thereon, said mechanism including revoluble horizontally shiftable parts inactive during the winding on of said element on said member, said parts when shifted, clutching said member therewith and when revolved driving said transmission means in a direction to provide respectively for the winding off of said element from said member, the winding on of said element on said structure and the winding up of the spring motor, and a pivotally suspended spring controlled tension device for said element arranged within said chamber forwardly of said winch mechanism.

19. In an extension stock for the purpose set forth, a hollow body providing a cartridge magazine having its forward end permanently open, said body being formed of a separate leading section and a separate follower section, said sections being disposed in endwise alignment, means for connecting said sections together in endwise opposed abutting relation, a revoluble roller carried by said leading section in close proximity to its forward end and disposed in close proximity to one of the walls of said magazine, said follower section having its forward end terminal portion formed with a cutout, a block mounted in said cutout, anchored to and extending laterally from said follower section, said block being provided with spaced recesses, shock absorbing means arranged in said recesses, and coupling means extending through said shock absorbing means and through said block and connected to the connecting means between said sections.

20. In an extension stock for the purpose set forth, a hollow body providing an elongated cartridge magazine permanently open at its forward end, means within said body to provide said magazine with a cartridge guide extending from the rear end of the magazine to a point in proximity to the forward end of the magazine, said cartridge guiding means arranged in proximity to one wall of said magazine, a cartridge trip roller arranged within the magazine, journaled in said body, arranged in close proximity to said wall and being disposed immediately forward of the forward end of the cartridge guide means.

21. In an extension stock for the purpose set forth comprising an elongated hollow body forming an elongated cartridge magazine permanently open at one end, said body further providing a chamber opening at its rear end at the rear end of the magazine, a pulling element for a cartridge pusher device adapted to travel in the magazine, said element extending from said chamber into said magazine and from said magazine into said chamber, means arranged within said chamber for operating said pulling element, and a suspended pivoted spring controlled tensioning device for said pulling element positioned in said chamber forwardly of the means for operating said element.

22. In an extension stock for the purpose set forth, an elongated hollow body providing an elongated cartridge magazine permanently open at one end, said body formed of a leading part and a follower part, and a shock absorbing structure extended laterally from the forward terminal portion of said follower part, said shock absorbing structure being connected with said follower part and with said leading part.

LOUIS NOLAN NOMAR.